United States Patent [19]

Aubareda Vallvey et al.

[11] Patent Number: 5,137,567
[45] Date of Patent: Aug. 11, 1992

[54] CORROSION INHIBITING PIGMENT

[75] Inventors: Juan Aubareda Vallvey, Barcelona; Oscar Leblanc Francia, Blanes; Martorell Solé, Barcelona, all of Spain

[73] Assignee: Colores Hispania S.A., Barcelona, Spain

[21] Appl. No.: 438,289

[22] Filed: Nov. 20, 1989

Related U.S. Application Data

[63] Continuation-in-part of Ser. No. 232,039, Aug. 15, 1988, abandoned.

Foreign Application Priority Data

Aug. 14, 1987 [ES] Spain .................................. 8702407

[51] Int. Cl.$^5$ .............................................. C04B 14/30
[52] U.S. Cl. ............................... 106/14.12; 106/14.21; 106/425; 106/426; 106/427
[58] Field of Search ............ 106/425, 426, 427, 14.12, 106/14.21

[56] References Cited

U.S. PATENT DOCUMENTS

| | | | |
|---|---|---|---|
| 2,251,869 | 8/1941 | Gamble et al. | 106/427 |
| 2,251,872 | 8/1941 | Gamble et al. | 106/427 |
| 4,294,808 | 10/1981 | Wasel-Nielen et al. | 106/425 |

Primary Examiner—William R. Dixon, Jr.
Assistant Examiner—Anthony J. Green
Attorney, Agent, or Firm—Sughrue, Mion, Zinn, Macpeak & Seas

[57] ABSTRACT

The pigment is constituted by zinc phosphate dihydrate or tetrahydrate with an excess of from 0.5 to 6% of zinc oxide over the stoichiometric amount and has the form of rough surfaced spheroids having a maximum dimension lying between 0.5 and 6 microns and a mean size lying between 1.5 and 2.5 microns.

5 Claims, 3 Drawing Sheets

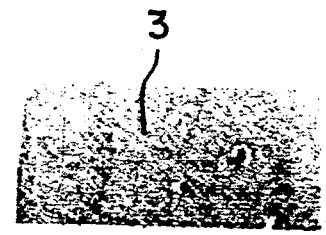
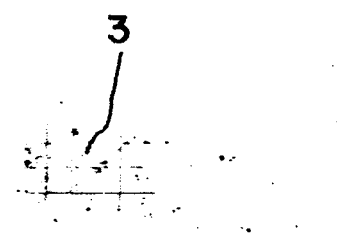
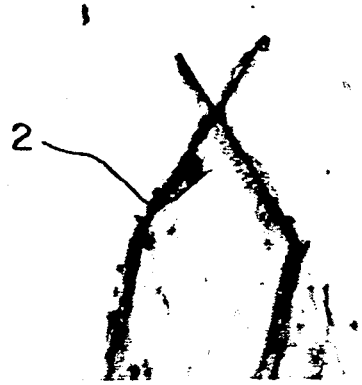
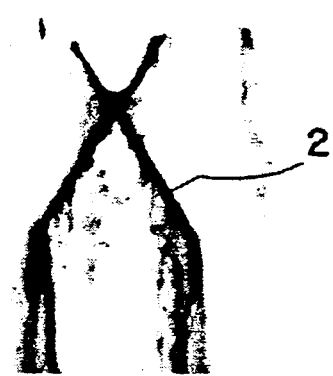
FIG. 5                FIG. 5a
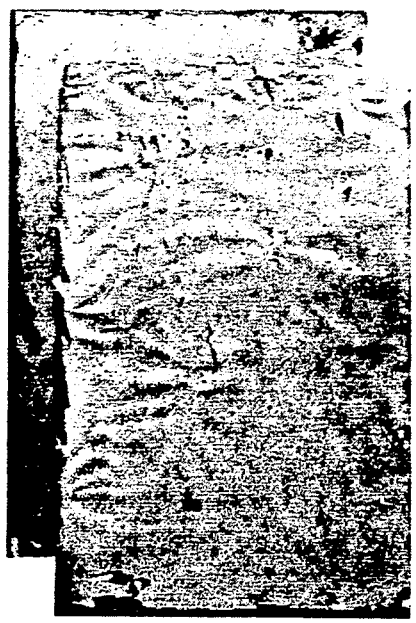
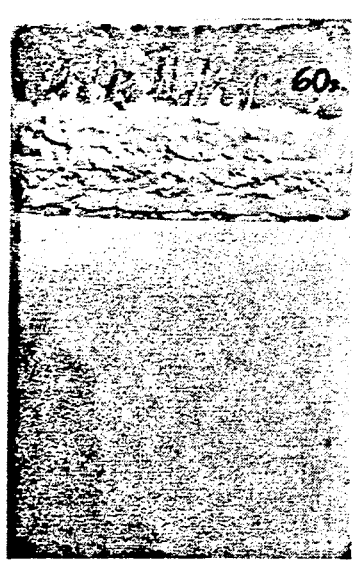
FIG. 6                FIG. 6a

CORROSION INHIBITING PIGMENT

This is a continuation-in-part of application Ser. No. 07/232,039, filed Aug. 15, 1988, now abandoned.

BACKGROUND OF THE INVENTION

1. Field of the Invention

This invention relates to a corrosion inhibiting pigment.

2. Description of the Prior Art

The use of crystallized zinc phosphate, either as the tetrahydrate or as dihydrate, as a corrosion inhibiting pigment has been known for some time. It is offered on the market in the form of finely divided white powder, constituted by microscopic crystals having the form of hexagonal slabs which may have a major diagonal dimension of up to 25 $\mu$m and a thickness of up to 4 $\mu$m. This product is used in the preparation of corrosion inhibiting primers forming part of protective coatings for metals. The limitations of this pigment are also known, since it does not give good results in the accelerated tests which have to be carried out prior to the approval of any protective coating system. To act, it needs a slow hydrolysis which does not have time to occur during the time the coating is exposed in a salt spray chamber (ASTM B-117). This means that the product is initially rejected in the accelerated prior tests in spite of the fact that it gives good results (effective protection) in long term weather exposure in primers. Many attempts have been made to improve this immediate effectivity by modifying the chemical composition with additions of other substances which, although they accelerate the immediate protective result, at long term suffer from the drawbacks of blistering and loss of adhesion of the coating.

It is the finding of this invention that the above mentioned drawbacks are overcome by using a pigment which, while being constituted by zinc phosphate dihydrate or tetrahydrate or a mixture of both, instead of consisting of slabs like zinc phosphate pigments of the prior art, consists of spheroidally shaped particles, each of which is made up of smaller zinc phosphate lamellar microcrystals which are generally disposed radially to form a pigment particle of spheroidal shape and rough surface, said rough surface consisting of the edges of the radially disposed zinc phosphate microcrystals. These spheroids have dimensions comprised between 0.5 and 6 microns, with a mean size between 1.5 and 2.5 microns, and the radially disposed microcrystals which constitute the particle have in turn a maximum dimension between 0.05 and 0.5 microns.

Although attempts have been made to improve the performance of prior art zinc phosphate pigments by reducing their particle size, no improvement was achieved. It is thus a finding of this invention that it is the shape of the zinc phosphate pigment particles which is relevant towards improving the performance of the chemical in accelerated tests, and specifically that clear advances are shown with respect to prior art zinc phosphate in corrosion inhibiting effectivity, adherence and (lack of) blistering of the protective films, as evidenced by salt spray and distilled water immersion tests at 50° C., when zinc phosphate pigments of spheroidal particle shape are used instead of the prior art slab shaped pigments.

The process for manufacturing said pigments comprises the following steps:

A finely dispersed slurry of zinc oxide is prepared, by slowly adding zinc oxide powder to a tank filled with water, with vigorous stirring in order to prevent the formation of lumps; the temperature may be between 20° and 30° C., and the final concentration about 25% by weight. This slurry is allowed to rest for 17 hours; afterwards it is circulated through a powerful mechanical disperser with a speed of 27,000 r.p.m., such as the Polytron (Switzerland) or Ultraturrax-IKA (W. Germany) types, which are both high frequency kinematic machines.

With the manufacture of the pigment of this invention being the reaction between a slurried solid (ZnO) and a liquid (aqueous solution of phosphoric acid and ammonium salt), care must be taken to make sure that the particles of the slurried solid are small enough as to make a large reaction surface available. Specifically, care must be taken that the surface of the zinc oxide particles (normally produced by combustion of the vaporized molten zinc) reacts with the water to give the hydroxide. The extent to which this reaction takes place in terms of the total mass of zinc oxide involved does not really matter, it is just required that the surface of the particles should have reacted with water, in order to avoid the need of excess phosphoric acid, which would result in an undesirable growth of the zinc phosphate particles. This hydration of the surface of the zinc oxide is facilitated when particles are made small enough, and this may be monitored by a change in the pH of the slurry from 6.2-6.6 for an "unactivated" (unreacted) slurry to 7.5-8.0 for an "activated" (surface hydrated) zinc oxide slurry.

In another tank, phosphoric acid of 85% purity is diluted with water, and an organic or inorganic ammonium salt is added to the solution. The purpose of adding the ammonium salt is to form a zinc-ammonia complex, which is believed to interfere with the zinc phosphate microcrystals nucleation and growth processes, resulting in spheroidal particles. It is a fact that it is the presence of plenty of ammonium ion that results in the unique morphology of zinc phosphate particles, which is a characteristic of this invention. It is not a limit to this invention that the ammonium salt be added to one of the two fluids which are mixed for reaction, namely the phosphoric acid containing solution as in Example 1. It may be also added to the zinc oxide slurry, or alternatively it may also be divided between both reacting fluids, in any ratio as long as the total required amount is used; in every case the desired morphology is obtained just the same. Nevertheless, it is practical to add the ammonium salt to the phosphoric acid solution in order to avoid a substantial thickening of the activated zinc oxide slurry. The amount of ammonium salt, expressed as ammonium chloride, needed to obtain the desired morphology may lie between 20 and 60% of the weight of ZnO used.

Thus, preferably, the activated zinc oxide slurry and the ammonium salt containing phosphoric acid solution are simultaneously poured into a small reactor with continuous overflow to a bigger tank, the reactor being stirred with a strong shear, for which dispersers with speeds between 22,000 and 27,000 r.p.m. are suitable. Throughout the pouring of the fluids, excess zinc oxide over the stoichiometric amount required for zinc phosphate formation is used; thus, at the end of the process, a final amount of phosphoric acid solution is poured alone into the small reactor, to eventually react with zinc oxide inside the bigger tank.

After 40 minutes of moderate stirring in the bigger tank, the formed zinc phosphate may be observed under a microscope as spheroidal particles covered by small microcrystals. The precipitate is then filtered and washed until foreign soluble salts are removed, and is subsequently dried and ground to give a pigment constituted essentially by zinc phosphate dihydrate and/or tetrahydrate (depending on the temperature at which it has been dried), with from 0.5 up to 6% excess of zinc oxide over the stoichiometric amount, formed by rough-surfaced spheroids having a maximum dimension lying between 0.5 and 5 microns and a mean size of 1.5 to 2.5 microns.

DESCRIPTION OF THE DRAWINGS

Reference is made hereinafter to the drawings accompanying the specification allowing a better understanding. In the drawings:

FIG. 5 is a front view of a sheet to which there has been applied a third sample of paint prepared with prior art zinc phosphate pigments.

FIG. 5a is a view similar to the previous one, except that the paint has been prepared with zinc phosphate pigment according to the invention.

FIG. 6 is a front view of a sheet to which there has been applied a fourth sample of paint prepared with prior art zinc phosphate pigment.

FIG. 6a is a view similar to the previous one, except that the paint has been prepared with zinc phosphate pigment according to the invention.

In FIGS. 1 and 1a, the first paint sample had an oil long alkyl resin (Synolac 503X60) as vehicle and a pigment concentration of 35% by volume, 27 wt % of the pigment being zinc phosphate; the dry paint film thickness was 33 μm; only one coat of paint had been applied and the cuts 2 had been made. The drawings illustrate the results of 400 hours exposure to salt spray, after which cross cuts 3 were made and the paint was peeled off with adhesive tape (left upper portion 4). Subsequently the coat of paint was removed from the right-hand side 6 of each test specimen with paint remover, allowing the degree of attack on the substrate to be better observed. The test specimen of FIG. 1a may be seen to have suffered less attack and that the adherence is better, since the cross cut portion 3 has not been peeled away.

In FIGS. 2 and 2a, the binder is an epoxy resin and polyamide in a ratio of 1.7:1, with a pigment concentration of 28% by volume, with 100% being zinc phosphate pigment, the dry paint coat thickness being 34 μm. The deterioration exhibited by the sheet of FIG. 2 (with prior art zinc phosphate pigment) is noticeably greater than that of the sheet painted with paint containing pigments according to the invention. The paint system is single coat and the Figures also illustrate the results of 400 hours exposure to salt spray. In this case, the paint was not peeled off.

In FIGS. 5 and 5a, two paints with linseed oil long alkyd resin (Synolac 503X60) and 63 wt % solids contents, a pigment concentration of 35% by volume, 27 wt % of the pigment content being zinc phosphate, were applied. The system was single coat and had a dry thickness of 33 μm. In FIG. 5 the zinc phosphate was prior art material and in 5a it was a according to the invention.

After applications on cold rolled steel sheets, previously degreased and cleaned of rust and after exposure to salt spray for 240 hours, the adherence to the test specimen prepared with the prior art pigment was seen to be less and that the attack on the area where a cut was made was also greater than in the test specimen with the pigment prepared in Example 1 to be described hereinafter.

In FIGS. 6 and 6a, cold rolled steel test specimens to which an epoxy-polyamide primer and a polyurethane finish coat have been applied are shown. Hereinafter a table is given with the results obtained in immersion tests. The different degree of adherence of the prior part pigment in comparison with the new product may be seen in FIGS. 6 and 6a. While it was possible to peel off the whole coat in the case of the former, in the latter it was possible to peel off, discontinuously, only a sixth part of the film after 60 seconds.

Figure 1:
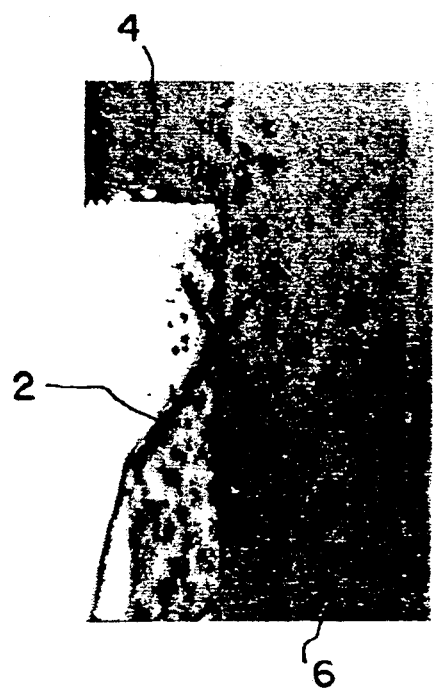
FIG. 1 is a front view of a cold rolled carbon steel sheet to which there has been applied a first sample of a paint prepared with prior art zinc phosphate pigments.
Figure 1A:
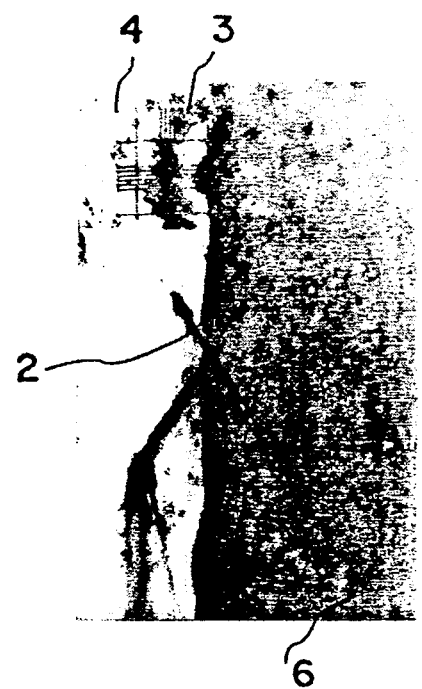
FIG. 1a is a similar view to the previous one, except that the paint has been prepared with zinc phosphate pigment according to this invention.
Figure 2:
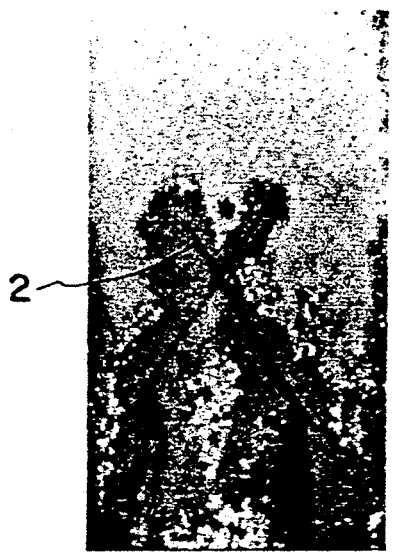
FIG. 2 is a front view of a sheet to which there has been applied a second sample of paint prepared with prior art zinc phosphate pigments.
Figure 2A:
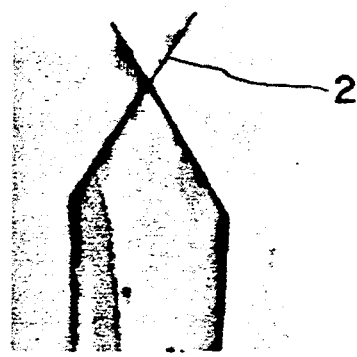
FIG. 2a is a similar view to the previous one, except that the paint has been prepared with zinc phosphate pigment according to the invention.
Figure 3:
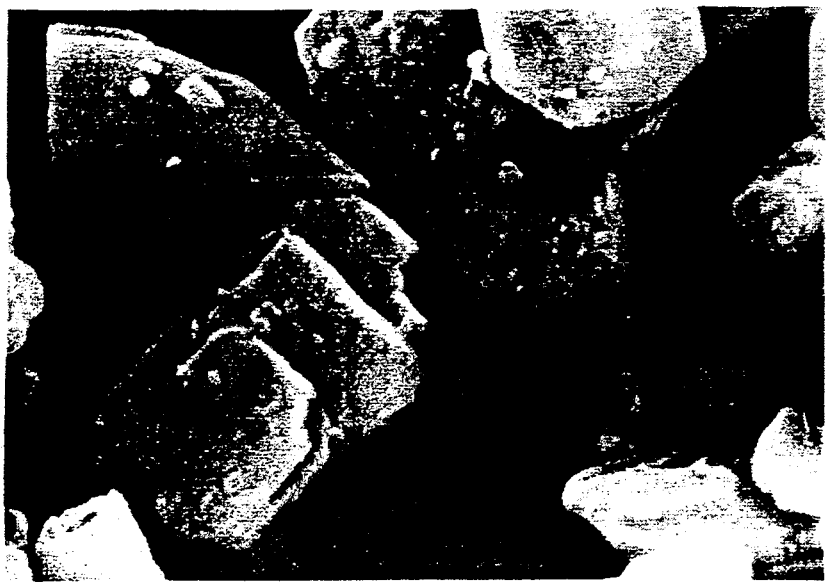
FIG. 3 is a view 5,000× of prior art zinc phosphate particles.

FIG. 3 is an illustration of pigments constituted by prior art zinc phosphate. Under the microscope, it is seen to be formed by very flat truncated pyramids, joined together at the base, virtually forming square or hexagonal slabs of a generally flat surface, although there are cracks, dislocations and some irregularities. The maximum dimension (diagonal) may be taken to lie between 4 and 25 microns, with a mean size of about 6 microns, while the thickness may be taken to lie between 12 and 5 microns, with a mean size of about 2 microns. In the case of a pure tetrahydrate, it is crystallized in an orthorhombic system, with a Hopeite structure. It may also be dihydrate if the final drying temperature is above 115° C. The commercial product is usually a mixture of the di- and tetrahydrate, with one predominating over the other. In long duration tests, these pigments give satisfactory results.

Figure 4:
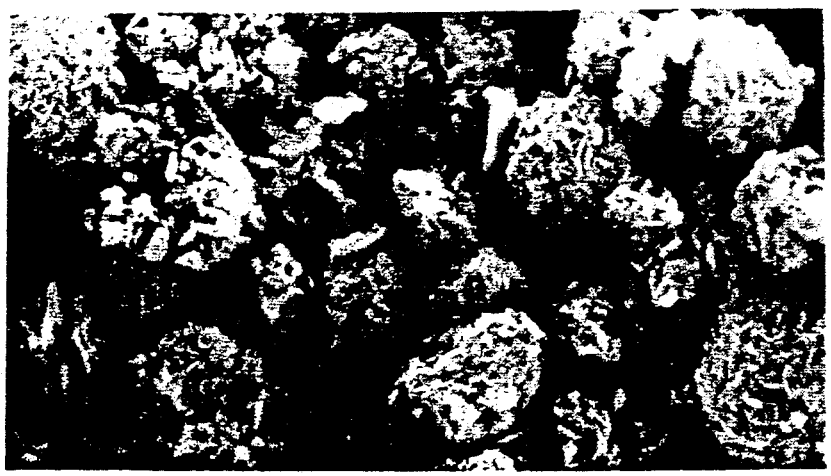
FIG. 4 is a view 5,000× of zinc phosphate particles according to the invention.
Figure 4A:
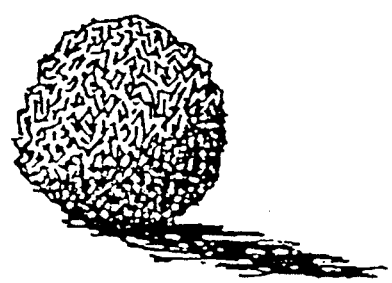
FIG. 4a is a view of a particle with a greater degree of magnification.

FIG. 4 is an illustration of pigments constituted by zinc phosphate according to the invention. The crystalline structure is that of a tetrahydrate with some dihydrate, but in X-ray diffraction it substantially appears as less perfect crystallization than the prior art material. The small size of the monocrystals and their irregular disposition means that less accumulated refractions of the crystal planes fulfilling Bragg's condition are obtained. The scanning electron microscope photographs show spherical pores having diameters of from 0.5 to 5 microns, with a mean diameter of 2.5 microns.

The surface of these pores is irregular and is formed by the edges of small lamellar hexagonal crystals having a diagonal of 0.05 to 0.5 microns, disposed more or less radially. The large surface area exhibited by these spheroidal forms, the exterior of which is constituted by an infinite number of lamellae implanted perpendicularly to the tangent in all directions, substantially increases the oil absorption and therefore the active surface, an example of which is the fact that the conductivity of a suspension in distilled water at 25° C. is from 4 to 5 times higher than that of a prior art zinc phosphate, i.e., while a prior art zinc phosphate pigment, after thorough washing with distilled water, has a conductivity of 30 to 50 μm/cm, the pigment according to the invention has a conductivity lying between 120 and 350 μm/cm, when the conductivity is measured according to ASTM D 2448-73. Immediately after precipitation and during drying, the spheroids form lumps which are easily broken apart by micronization, being reduced to the original spheroids. To summarize, the pigment of the invention is distinguished from the prior art pigment in the form of the elementary particles, mean size, size distribution and specific area. All of this provides for increased reactivity, making this new pigment more effective in the salt spray tests, conferring greater adherence to the paint films, improving the resistance to blistering and giving a better behaviour in the immersion tests.

In a determination according to ISO/R 787, the pigment of the invention exhibited an oil absorption of from 55 to 95.

A chemical analysis of the product of the invention in comparison with a prior art product is as follows:

|  | Prior art Zinc Phosphate | Zinc Phosphate according to Ex. 1 |
| --- | --- | --- |
| Moisture at 105° C., % | 3 | 6 |
| Loss at 550° C., % | 9.7 | 12.1 |
| Zn content on calcined product, % | 51 | 53 |
| Soluble salts, % | 0.23 | 0.28 |
| Conductivity at 25° C., μmS/cm | 86 | 428 |
| pH aqueous extract | 6.9 | 7.8 |
| Residue in sieve at 44 μm, % | 0.06 | 0.1 |
| Oil absorption | 15 to 20 | 76 to 83 |

In the Examples described below, ammonium chloride or nitrate is used as an ammonium salt. Nevertheless, the use of these salts is not exclusive and ammonium acetate, tartrate, phosphate or any other ammonium salt may be used. Even ammonium hydroxide could be used, but it is not used for reasons of economy, in view of its basic nature.

Also for reasons of economy, it is not recommended to use zinc chloride and trisodium phosphate as reactants in the presence of an ammonium salt in the preparation of these products. In this case there is also the difficulty of exhaustively washing out the sodium chloride formed in the reaction.

EXAMPLE 1

On the one hand, a dispersion was prepared by slowly adding 168 Kg of zinc oxide over 850 l of water, under moderate stirring and at a temperature of 25° C. This slurry, of pH 6.3, was allowed to stand still overnight and was pumped next day through a 15 HP on-line disperser manufactured by Kinematica (Switzerland) having a strong shearing action. A final pH of 7.5 indicated that the zinc oxide slurry had been converted to zinc hydroxide to a sufficient extent; the slurry was then heated up to 60° C.

On the other hand, in a separate container appropriate for containing acid, a mixture of 85 l of phosphoric acid (d=1.640) with 67 Kg of ammonium chloride diluted to 350 l, also under heating to 60° C., was prepared.

The two fluids were poured together in a continous reactor stirred with flowrates adjusted appropriately to leave always a considerable excess (0.0576 g/ml) of zinc oxide. The reactor stirrer must be a high powered machine having a peripheral speed of 20 to 35 m/s. The pouring time should lie between 30 and 40 min. The starting temperature of 60° C. may reach 80° C. at the end of the pour. Normally, at the end, some phosphoric acid solution was left over and had to be poured alone, since the zince oxide paste was exhausted first. The precipitate develops by stirring for about 40 minutes and the final pH was adjusted to 7. The mixture was filtered and washed to remove the chlorides and was dried at 95°-100° C. Finally, 270 Kg of a particulate product formed by spheroids covered by small lamellar crystals having a behaviour and characteristics similar to those described above was obtained. The yield is not stoichiometric, due to the zinc which remained in solution in the mother liquors.

The behaviour of the pigment prepared according to the above Example in salt spray tests was described above when describing FIGS. 5 and 5a.

To check the results obtained with immersion tests, paint systems comprising an epoxy-polyamide primer and a polyurethane finish on cold rolled sheet steel test specimens were prepared. The primer was formed by: a mixture of epoxy and polyamide resins at a ratio of 1.3:1 with two pigment volume concentrations (P.V.C.) of 25% and 35%, and with 100% of the pigment being zinc phosphate. The paints were applied at two thicknesses of 15 and 30 microns for each P.V.C. The finish coat was polyurethane based (two components) pigmented with titanium dioxide with a P.V.C. of 16% and a thickness of 75 microns when dry. The painted sheets were immersed in distilled water at 50° C. for four days. The results obtained after this test are summarized in the table, evaluating blistering, time required to peel the film, which time is in direct relationship with the adherence, and corrosion stains. As in the previous cases, the tests were run on prior art pigment and with the pigment of the invention.

|  | BLISTERING (ASTM D-714) | | TIME REQUIRED (seconds) TO PEEL FILM 90 mm × 140 mm | | CORROSION STAINS (ASTM D-160) | |
| --- | --- | --- | --- | --- | --- | --- |
|  | Prior Art Zinc Phosphate | Product of Example 1 | Prior art Zinc Phosphate | Product of Example 1 | Prior art Zinc Phosphate | Product of Example 1 |
| Primer, PVC 25% | | | | | | |
| 15 μm | 8-D | 10 | 50 | 110 | 7 | 10 |
| 30 μm | 8-M | 10 | 25 | 170 | 9 | 10 |
| Primer, PVC 35% | | | | | | |

| | BLISTERING (ASTM D-714) | | TIME REQUIRED (seconds) TO PEEL FILM 90 mm × 140 mm | | CORROSION STAINS (ASTM D-160) | |
|---|---|---|---|---|---|---|
| | Prior Art Zinc Phosphate | Product of Example 1 | Prior art Zinc Phosphate | Product of Example 1 | Prior art Zinc Phosphate | Product of Example 1 |
| 15 μm | 8-D | 10 | 30 | 360 | 7 | 10 |
| 30 μm | 10 | 10 | 240 | 340 | 10 | 10 |

The table shows that the protection difference is greater at thin dry film values and at lower Pigment Volume Concentrations. The difference of adherence between the prior art pigment and that of the new product is shown in FIGS. 6 and 6a, as stated above.

EXAMPLE 2

An aqueous suspension of 168 Kg of zinc oxide with a total volume of 800 l was prepared. It was activated and 40 Kg of ammonium chloride were added and, the temperature was held to room temperature (15° to 20° C.). Separately 87 Kg of phosphoric acid (d=1.628) were dissolved in water to 300 l, the temperature being held at room temperature.

The suspension and the solution were poured simultaneously in a stirred continous reactor. The reactants entered at the bottom of the reactor and the reacted product was removed by overflow. The temperature was held at 20° C. Pouring lasted 20 minutes. The product was allowed to develop for 30 minutes. The product was decanted and washed to complete removal of chloride, i.e., a conductivity of 70 μs/cm was observed. It was filtered and dried at 100° C. After grinding, the product had a similar appearance under the microscope to that of Example 1 and behaved in a similar way when incorporated in paints.

EXAMPLE 3

In this Example, the pigment was prepared under the same conditions as in Example 1, but using ammonium nitrate instead of ammonium chloride. The product obtained exhibited similar physical characteristics, but the SEM photographs obtained showed that the elementary crystals forming the spheroidal pores were larger than when ammonium chloride was used. This was confirmed by X-ray diffraction in which the Hopeite structure predominated over the others. The physical and chemical behaviour of the pigment was the same as that of Example 1.

What is claimed is:

1. A corrosion inhibiting pigment obtained by the reaction of phosphoric acid and zinc oxide, which pigment consists essentially of zinc phosphate dihydrate or tetrahydrate or a mixture of both and an amount of zinc oxide in free or mixed crystal form in an amount of from 0.5 to 6% over the stoichiometric amount required for the reaction of zinc oxide and phosphoric acid, and consisting essentially of spheroids having a rough surface the maximum dimension of which lies between 0.5 and 6 microns and having a mean size between 1.5 and 2.5 microns.

2. The pigment of claim 1, wherein said rough surface is made up of zinc phosphate lamellar microcrystals having a maximum dimension lying between 0.05 and 0.5 microns, wherein said zinc phosphate lamellar crystals being are disposed in a direction perpendicular with respect to a tangent to the surface of said rough surface.

3. The pigment of claim 1 having an oil absorption between 55 and 95 when determined according to ISO/R 787.

4. The pigment of claim 1 which, after washing with distilled water, exhibits a conductivity of 120 to 350 μS/cm when determined according to ASTM D 2448-73.

5. A corrosion inhibiting coating comprising at least one organic binder and a pigment according to claims 1 to 4, said binder being present in an amount sufficient to adhere said pigment to a solid surface and said pigment being present in an amount effective to provide a corrosion inhibiting effect to said solid surface.

* * * * *